UNITED STATES PATENT OFFICE.

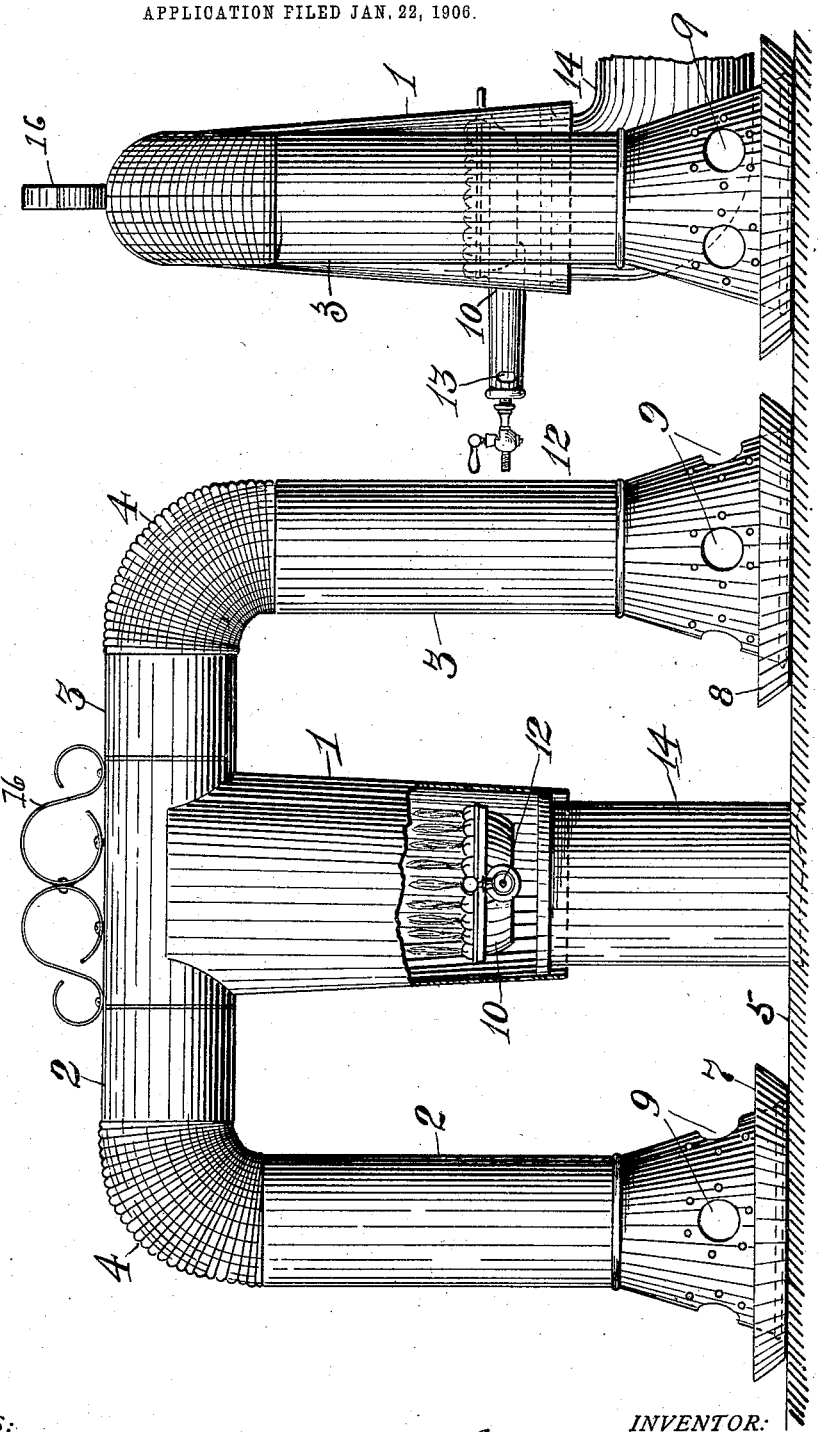

JOHN HENRY BLAKEWAY, OF SAN FRANCISCO, CALIFORNIA.

HEATING APPARATUS.

No. 841,107.　　　　Specification of Letters Patent.　　　　Patented Jan. 15, 1907.

Application filed January 22, 1906. Serial No. 297,216.

*To all whom it may concern:*

Be it known that I, JOHN HENRY BLAKEWAY, a citizen of the United States of America, residing at San Francisco, county of San Francisco, and State of California, have invented certain new and useful Improvements in Heating Apparatus; and I hereby declare the following to be a full, clear, and exact description of the same, reference being had to the accompanying drawings, forming a part of this specification.

This invention relates to heating apparatus and to certain useful improvements therein as hereinafter particularly described, and illustrated by drawings that form a part of this specification.

My improvements consist in a vertically-disposed furnace or heating chamber with lateral diverging conducting-pipes curved and extended downward to the floor, discharging the heated air and products of combustion radially through suitable apertures at a point as near to the floor as possible, these downtake-conductors forming a support for the structure and standing in open-top vessels to catch and evaporate moisture arising from the expanding air in the conduits or other cause.

The objects of my invention are to provide heating apparatus of a semiportable nature that will utilize and apply all the heat generated by a heating apparatus of any kind and discharge the direct heat at or near the floor-level. To this end I provide apparatus substantially as shown in the drawings herewith.

Figure I is a side view of a heating device made according to my invention, and Fig. II an end view in a plane at a right angle to Fig. I.

1 is a heating or combination chamber communicating at the top with branched conductors or flues 2 and 3, curved at 4 and extending downward to the floor 5, as seen in Fig. I. The conductors 2 and 3 rest in open-top pans 7 and 8 and have perforations 9, forming outlets for hot air and the gases of combustion, if any exist. The present drawings illustrate the chamber 1 supplied with a common multijet gas-burner 10, gas entering at 12 and the air required for combustion at 13 in the usual manner. Circulating air is supplied through the conductor 14, that connects to the bottom of the chamber 1, and may pass down through the floor 5, as shown in Fig. I, or may be curved and extend horizontally, as in Fig. II, and through a wall to external or pure air.

The pans 7 and 8 are simple open-top vessels to catch any moisture forming in the conductors 2 and 3, which moisture is again absorbed by the hot air issuing at 9, so that no overflow takes place.

16 is an ornamental handle employed in lifting and moving the structure, which is supported by the conducting-pipes 2 and 3, as shown in the drawings.

When the amount of heat required is more than can be generated in one chamber or by one burner or lamp, the chamber 1 and conductors 2 and 3 are multiplied accordingly, the manner of operating being the same.

The structure can be made in a more or less ornate form, as its uses may require, and modified in dimensions, also can be made for either fixed or portable use, and the means of heating that which is most suitable and economical.

In operating heat is generated in the chamber 1, which ascends to the conductors 2 and 3, drawing inward through the conductor 14 or at the bottom of the furnace 1 a strong current of air, which after being heated is expelled at the orifices 9, as before explained.

Having thus explained the nature and objects of my invention and the manner of its operating, what I claim as new, and desire to secure by Letters Patent, is—

In heating apparatus, a vertically-disposed heating-chamber, heat-generating means within said chamber, means for supplying fresh external air to said chamber at its bottom, downwardly-curved flues extending from the top of said chamber to the floor, and open-top pans in which said flues rest, for receiving condensed moisture therefrom, said flues having lateral apertures near the bottom for the escape of heated air, substantially as specified.

In testimony whereof I have signed my name to this specification in the presence of two subscribing witnesses.

JOHN HENRY BLAKEWAY.

Witnesses:
　　PELLEW LANGFORD ENNOR,
　　I. MEININGER.